UNITED STATES PATENT OFFICE.

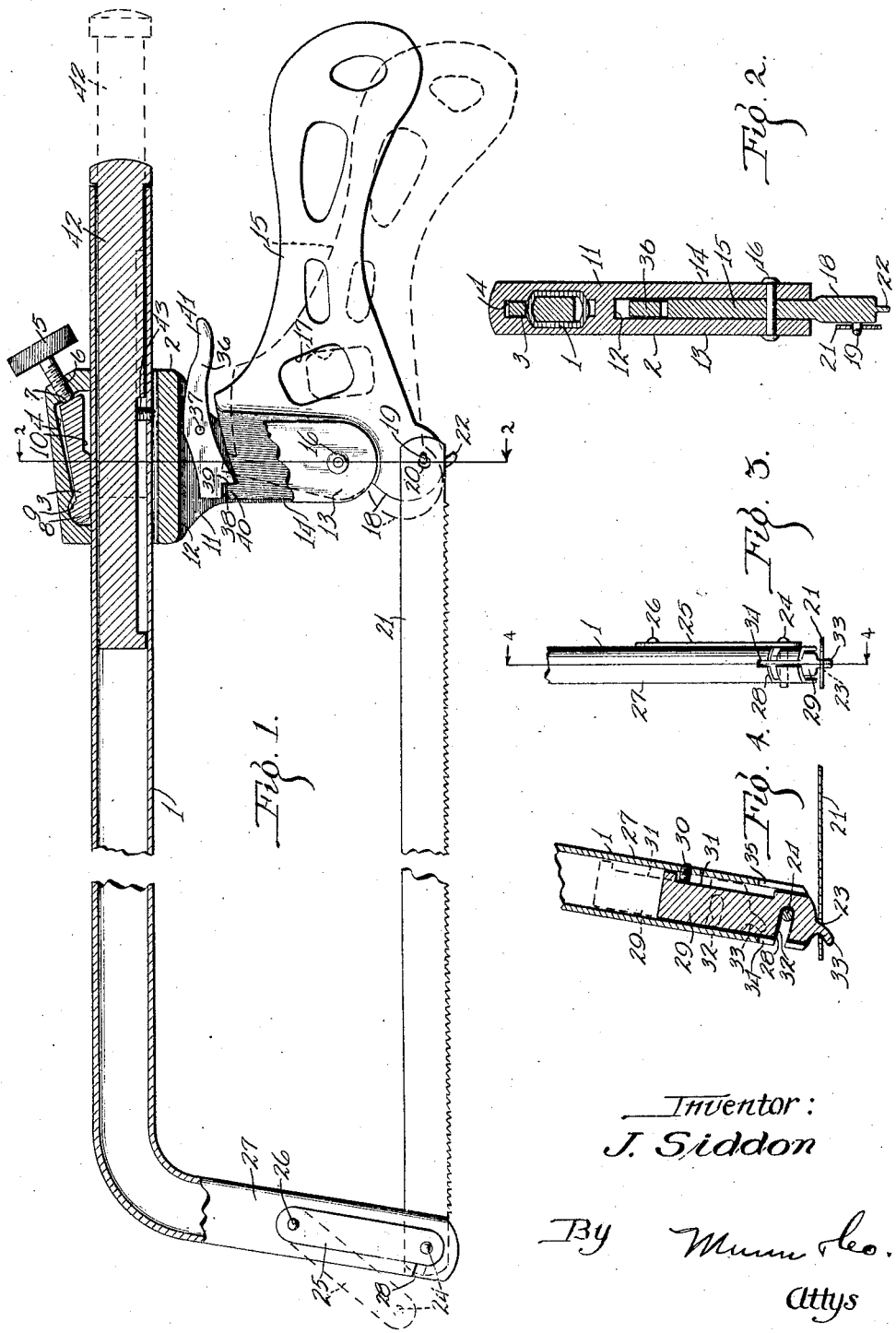

JOSEPH SIDDON, OF JOLIET, ILLINOIS.

HACK SAW.

1,406,422.　　　Specification of Letters Patent.　　Patented Feb. 14, 1922.

Application filed June 3, 1921. Serial No. 474,607.

*To all whom it may concern:*

Be it known that I, JOSEPH SIDDON, a citizen of the United States, and a resident of Joliet, in the county of Will and State of Illinois, have invented a new and useful Improvement in Hack Saw, of which the following is a full, clear, and exact description.

My invention relates to improvements in hack saws, and it consists in the combinations, constructions and arrangements herein described and claimed:

An object of my invention is to provide a novel form of hack saw in which the use of adjusting screws to hold the saw blade is obviated.

A further object of my invention is to provide a device of the character described that has means for holding a saw blade in either vertical or horizontal position.

A further object of my invention is to provide a hack saw in which a saw blade can be quickly and easily engaged or disengaged.

A further object of my invention is to provide a hack saw having means for holding saw blades of various sizes in position to engage work.

Other objects and advantages will appear in the following specification, and the novel features of the invention will be particularly pointed out in the appended claim.

My invention is illustrated in the accompanying drawings, forming part of this application, in which—

Fig. 1 is a side elevation of the device, portions thereof being broken away and other portions being shown in section.

Fig. 2 is a section along the line 2—2 of Fig. 1,

Fig. 3 is an end view of a fragmentary portion of the device,

Fig. 4 is a section along the line 4—4 of Fig. 3.

In carrying out my invention, I provide a substantially L-shaped frame member 1 that is preferably tubular and made of a material, such as steel, having sufficient strength to provide the requisite rigidity. A handle carrying member 2 is slidably disposed on the frame member 1 and is secured in adjusted position therealong by means of a friction latching member 3 disposed in a recess 4 contiguous to the frame member 1 and arranged to be actuated by an adjusting screw 5. The adjusting screw 5 is threaded through an opening 6 in the carrying member 2 and contacts an inclined end wall 7 of the latching member 3. The latching member 3 is provided with a head 8 disposed in a socket 9 in the wall of the recess 4 and is cut away at 10 along its wall contiguous to the frame member 1 from a point approximately intermediate its length to the inclined rear wall thereof. In consequence, the latching member 3 will pivot about its head to frictionally contact with the frame member 1 and securely hold the carrying member 2 in adjusted position when the adjusting screw 5 is manipulated to impose a stress on the inclined rear wall 7.

The carrying member 2 has an integral pendant extension 11 fashioned with a vertically extending slot 12 in the lower end thereof, thereby defining spaced apart parallel arms 13 and 14. The arms 13 and 14 are arranged to straddle a handle 15 which is pivoted thereto by means of a pin 16, as best seen in Figures 1 and 2. The handle 15 is adapted to be gripped by hand and has an opening 17 adjacent to its forward end through which the first finger of the hand may be projected. The handle 15 has an integral extension 18 at its forward end adjacent to the lower edge thereof and this extension has a laterally extending pin or hook 19 adapted to engage an opening 20 that is ordinarily provided in a hack saw blade 21 at one end thereof. The extension 18 is also provided with an integral depending pin or hook 22 that is likewise adapted to engage the opening 20 of the hack saw blade 21.

The hack saw blade 21 is formed with an opening 23 adjacent to its other end, as is usual, and a pin 24 carried by a blade supporting member 25 is projected through this opening. The blade supporting member 25 is pivoted at 26 adjacent to its upper end to the laterally turned portion 27 of the L-shaped frame member 1 so that the pin 24 will swing into a slot 28 in the wall of the portion 27. A slidable blade engaging member 29 is disposed within the bore of the portion 27 and secured in adjusted position therealong by means of a set screw 30. The end of the set screw 30 projects into a groove 31 in the wall of the member 29 and the end walls of the slot 30 provide stop members for limiting the movement of the sliable member 29. The latter has a slot 32 substantially alined with the slot 28 when in the position illustrated in Fig. 4 and the pin 24 moves into the slot 32 and contacts the inner wall thereof. The slidable member 29 has a hook or pin extension 33 at its lower end adapted to engage the opening 23 in the hack saw blade when the opening 20 is engaged by the hook 22 of the extension 18. The portion 27 is cut away at opposite sides adjacent to its lower ends, as at 34 and 35 to permit convenient adjustment of the hack saw blade so that the latter is engaged selectively by the hook 33 or the pin 24.

From the foregoing description of the various parts of the device, the operation thereof may be readily understood. In adjusting the hack saw blade to the frame, the forward end thereof is first attached by placing the opening 23 in engagement with the pin 24 which is then moved through the slot 28 into the slot 32 and against the inner end wall of the latter. The handle 15 is then moved into the position indicated by the dotted lines in Fig. 1 and the rear end of the hack saw blade is placed on the pin 19. The handle carrying member 2 is then moved along the frame member 1 until the hack saw blade 21 is taut and is clamped in adjusted position through the agency of the adjusting screw 5 and the latching member 3. The handle 15 is then moved into the position indicated by the full lines in Fig. 1, when it will be engaged by a pawl 36 and firmly held in that position. It will be observed that the pawl 36 is disposed between the arms 13 and 14 and attached thereto intermediately by a pivot pin 37. The pawl is cut away at 38 to define a shoulder 39 adapted to engage a vertical projection 40 of the handle 15. When it is desired to remove the hack saw blade 21, pressure is applied to the finger rest 41 of the pawl 31, thereby causing the latter to disengage the handle 15 which thereupon moves about its pivot into the position indicated by the dotted lines in Fig. 1.

The handle carrying member 2 may be moved along the frame member 1 to adapt the frame for holding hack saw blades of various lengths. A slidable auxiliary handle member 42 is disposed in the tubular frame member 1 and may be moved rearwardly thereof and secured in adjusted position by means of a set screw 43. In the event a relatively large hack saw blade is employed, the auxiliary handle member 42 is positioned as indicated by the dotted lines in Fig. 1 and may be gripped by hand in order to insure greater stress on the work. The hack saw blade 21 may be adjusted to be carried by the hooks 22 and 23 and will then occupy a position at right angles to that illustrated in Fig. 1. The device is relatively simple in construction and is thoroughly effective for the purpose intended. It is to be observed that hack saw blades of various lengths will be held firmly in position without the tightening strain being carried by adjusting screws, such as are ordinarily employed in similar devices, of which I am aware.

I claim:

A device of the character described comprising a hollow frame member having a laterally bent end portion, a slidable mounted member disposed within said frame and arranged to be projected at will beyond the open end of said laterally bent portion of said frame, and to support thereupon one end of a hack saw blade, in a plane transverse to the plane of said frame, and a supporting member carried by said frame adjacent said slidably mounted member for fixedly supporting one end of a hack saw blade in a plane parallel to the plane of said frame.

JOSEPH SIDDON.